(12) United States Patent
Smith-Sebasto

(10) Patent No.: US 8,889,407 B2
(45) Date of Patent: Nov. 18, 2014

(54) COMPOSTING MACHINE

(75) Inventor: Nicholas Smith-Sebasto, Newton, NJ (US)

(73) Assignee: FOR Solutions IP, LLC, Newton, NJ (US)

( * ) Notice: Subject to any disclaimer, the term of this patent is extended or adjusted under 35 U.S.C. 154(b) by 825 days.

(21) Appl. No.: 13/016,428

(22) Filed: Jan. 28, 2011

(65) Prior Publication Data

US 2012/0196357 A1    Aug. 2, 2012

(51) Int. Cl.
C12M 1/10        (2006.01)
C05F 17/02       (2006.01)

(52) U.S. Cl.
CPC ........... *C05F 17/0223* (2013.01); *C05F 17/027* (2013.01)
USPC .................. 435/290.3; 435/290.4; 435/298.2

(58) Field of Classification Search
CPC ...... C05F 17/027; C05F 17/0223; B01F 9/02; B01F 9/0005; B01F 2009/0063
USPC .......................................... 435/290.3, 298.2
See application file for complete search history.

(56) References Cited

U.S. PATENT DOCUMENTS

| | | | |
|---|---|---|---|
| 2,994,592 A | | 8/1961 | Scovel et al. |
| 3,245,759 A | | 4/1966 | Eweson |
| 3,357,812 A | | 12/1967 | Snell |
| 4,204,959 A | | 5/1980 | Kreuzberg et al. |
| 4,946,108 A | | 8/1990 | Konig et al. |
| 5,169,782 A | * | 12/1992 | Murphy et al. ............. 435/290.3 |
| 5,244,804 A | * | 9/1993 | Horkan et al. ............. 435/290.1 |
| 5,407,809 A | | 4/1995 | Finn |
| 5,591,635 A | | 1/1997 | Young et al. |
| 5,605,834 A | | 2/1997 | Eberthson et al. |
| 5,759,850 A | | 6/1998 | Seymour |
| 6,071,740 A | | 6/2000 | Kerouac |
| 6,352,855 B1 | | 3/2002 | Kerouac |
| 6,783,975 B2 | | 8/2004 | Windle |
| 7,520,457 B1 | | 4/2009 | Poitras et al. |

FOREIGN PATENT DOCUMENTS

| | | |
|---|---|---|
| AT | 354479 B | 1/1980 |
| DE | 3626902 A1 | 2/1988 |
| EP | 0309872 A2 | 4/1989 |
| EP | 0354443 A2 | 2/1990 |
| GB | 931365 A | 7/1963 |

OTHER PUBLICATIONS

Jet Compost Products, website related to Windle Patent No. 6,783,975, obtained from www.jetcompost.com on Aug. 22, 2012.

(Continued)

*Primary Examiner* — William H Beisner
(74) *Attorney, Agent, or Firm* — Pergament Gilman & Cepeda LLP

(57) ABSTRACT

An apparatus for the aerobic in-vessel rotary drum composting of feedstock into nutrient-rich compost comprising means for shredding said input material, said means configured and powered for shredding said feedstock into a particle size no larger than one cubic inch, a vessel having an input port on top of such vessel and a discharge port, said vessel comprising one chamber, said vessel configured and powered for composting said shredded feedstock, and said vessel tilted from the input port to the discharge port, means for passing said feedstock from said means for shredding into said vessel, means for rotating said vessel, means for introducing air into said vessel and a process controller, said process controller communicating with said means for shredding, said vessel, said means for rotating said vessel and said means for introducing air into said vessel.

19 Claims, 3 Drawing Sheets

(56) References Cited

OTHER PUBLICATIONS

Notification Concerning Transmittal of International Search Report and Written Opinion of the International Searching Authority, dated Apr. 17, 2012, and the International Search Report and Written Opinion of the International Searching Authority, dated Apr. 17, 2012, for corresponding International Patent Application No. PCT/US2012/022627.

Notification Concerning Transmittal of International Preliminary Report on Patentability (Chapter I of the Patent Cooperation Treaty), dated Aug. 8, 2013, for corresponding International Patent Application No. PCT/US2012/022627.

International Preliminary Report on Patentability, dated Jul. 30, 2013, for corresponding International Patent Application No. PCT/US2012/022627.

Screenshots of www.gcpl.ca including screenshots of one or more composters and related products discussed thereon, screenshots retrieved on Apr. 15, 2014 (21 pages total).

* cited by examiner

COMPOSTING MACHINE

FIELD OF THE INVENTION

This invention relates to the contained digestion of feedstock consisting of food waste and associated organic materials into nutrient-rich compost.

BACKGROUND ON THE INVENTION

According to the United States Environmental Protection Agency, the United States generated approximately 34 million tons of food scraps in 2009. That's 22 tons or roughly 3 times the amount that was generated in 1960. That number continues to grow every year as the population continues to increase. In fact, while the average American generated only 120 lbs. of food scraps in 1960, that figure increased to 221 lbs. in 2009. At the rate of increase between 1960 and 2008, the amount of food scraps generated by Americans will grow to over 39 million tons by 2018.

Public and private sectors are facing increasing transportation and disposal costs for all discards, including food scraps. There is also increasing concern about the sustainability of current disposal practices, which are instigating investigations into more environmentally benign disposal options. Previous methods such as landfilling and incineration are being increasingly recognized as unsustainable.

Transporting food scraps to landfills contributes enormously to anthropogenic sources of greenhouse gases such as carbon dioxide and nitrogen and sulfur oxides as well as other general air pollutants such as particulate matter, volatile organic compounds, and carbon monoxide. Once land-filled, organic discards such as food scraps contribute to methane production, a greenhouse gas believed to be 20-70 times more effective at trapping heat in Earth's atmosphere than carbon dioxide. While some landfills are collecting the methane gas, most do not; it is simply vented to the atmosphere. In the U.S., this situation is further complicated by the rapidly approaching closure of many landfills.

Transporting food scraps to incinerators, or waste-to-energy facilities, contribute in the same manner to greenhouse gas emissions. The difference is that while no methane is emitted, other gases are. Additionally, food scraps have one of the lowest BTU values per pound. Compared to plastics, which range between 11,000 and 20,000 BTUs/lb.; rubber, which produces approximately 11,000 BTUs/lb.; newspaper, which produces 8,000 BTUs/lb.; cardboard, which produces 7,000 BTUs/lb.; food scraps produce only 2,600 BTUs/lb. Consequently, incinerator operators may be forced to supplement their fuel source with fossil fuels to maintain high burning temperatures if too much of their fuel is food scraps.

The benefits of aerobic digestion of organic discards are well documented. In fact, it is the planetary default for the recycling of organic matter. When systems designed by humans replicate these biological processes, it is known as composting and the end-product is known as compost. Commercial or industrial applications have often focused on outdoor windrowing technology. Problems associated with this option include odors, limitations on what may be composted (animal products are often excluded), time to produce the compost, and energy required. Recently, interest in aerobic in-vessel rotary drum technology (known by various different names, including rotary drum) has increased. This is because many of the concerns about windrowing are addressed. Because they are contained units, aerobic in-vessel systems dramatically reduce odor issues; remove limitations about what may be composted (animal products are acceptable), dramatically reduce the time to produce the compost, and require much less energy. It has also been suggested that "Harvesting food waste as a reusable resource is the next frontier in recycling."

Despite such encouraging comments, the recycling of food scraps via composting has remained at about 2.5% of the total amount generated since 2000. Part of the explanation for this finding is that many of the existing aerobic in-vessel rotary drum digestion systems available to the mass market have not been value-engineered, do not include required safety features, and are aesthetically unpleasing.

In light of these and further disadvantages of prior art composting system and methods, including their relative complexity and other design shortcomings, it is clear that there remains a need for an improved composting system and method that overcomes one or more of the disadvantages of the prior art. It is clearer still that a composting system and method that provides a solution to each of the above-described advantages while demonstrating enhanced effectiveness and utility would represent a market advance in the art.

SUMMARY OF THE INVENTION

The invention provides an apparatus for the aerobic in-vessel rotary drum composting of feedstock into nutrient-rich compost. The apparatus comprises means for shredding said input material, said means configured and powered for shredding said feedstock into a particle size no larger than one cubic inch, a vessel having an input port on top of such vessel and a discharge port, said vessel comprising one chamber, said vessel configured and powered for composting said shredded feedstock, and said vessel tilted from the input port to the discharge port, means for passing said feedstock from said means for shredding into said vessel, means for rotating said vessel, means for introducing air into said vessel, and a process controller, said process controller communicating with said means for shredding, said vessel, said means for rotating said vessel and said means for introducing air into said vessel.

The means for passing said feedstock from said means for shredding into said vessel comprises an input hopper connected to said means for shredding and an auger and a chute connecting said means for shredding to said input port of said input end of said vessel.

The vessel comprises means for tumbling to facilitate mixing of said shredded materials as the vessel rotates and the means for introducing air into said vessel comprises means for introducing air into an aeration port of said vessel. The means for aerating comprises perforations in the bottom part of said vessel and means for forcing said air into said perforations. Temperature in the vessel is maintained in the range of 100 to 135° F.

The means for rotating said vessel comprises a base frame and a motorized direct-drive system comprising a motor and a gearbox attached to said base frame and coupled to said drum.

The apparatus further comprises means for collecting said digested feedstock and said means for collecting comprises a screener.

In one embodiment, the invention provides for an apparatus for the aerobic in-vessel rotary drum composting of feedstock into nutrient-rich compost. The apparatus comprises a shredder for shredding said feedstock, a hopper connected to said shredder to facilitate feeding of said feedstock, a vessel having an input port on top of such vessel and a discharge port, said vessel comprising one chamber, said vessel configured and powered for composting said shredded feedstock, and said vessel tilted from the input port to the discharge port, an auger and a chute connecting said shredder to said input port of said input end of said vessel, means for rotating said vessel, said means for rotating said vessel comprises a base frame and a motorized direct-drive system comprising a motor and a gearbox attached to said base frame and coupled to said drum, means for introducing air into said vessel, a process controller, said process controller communicating with said means for shredding, said vessel, said means for rotating said vessel and said means for introducing air into said vessel.

Still other objects and advantages of the present invention will become readily apparent to those skilled in this art from the detailed description that follows.

BRIEF DESCRIPTION OF THE DRAWINGS

For the purposes of illustrating the various aspects of the invention, wherein like numerals indicate like elements, there are shown in the drawings simplified forms that may be employed, it being understood, however, that the invention is not limited by or to the precise arrangements and instrumentalities shown. To assist those of ordinary skill in the relevant art in making and using the subject matter hereof, reference is made to the appended drawings and figures, wherein.

DESCRIPTION OF THE PREFERRED EMBODIMENT

Figure 1:
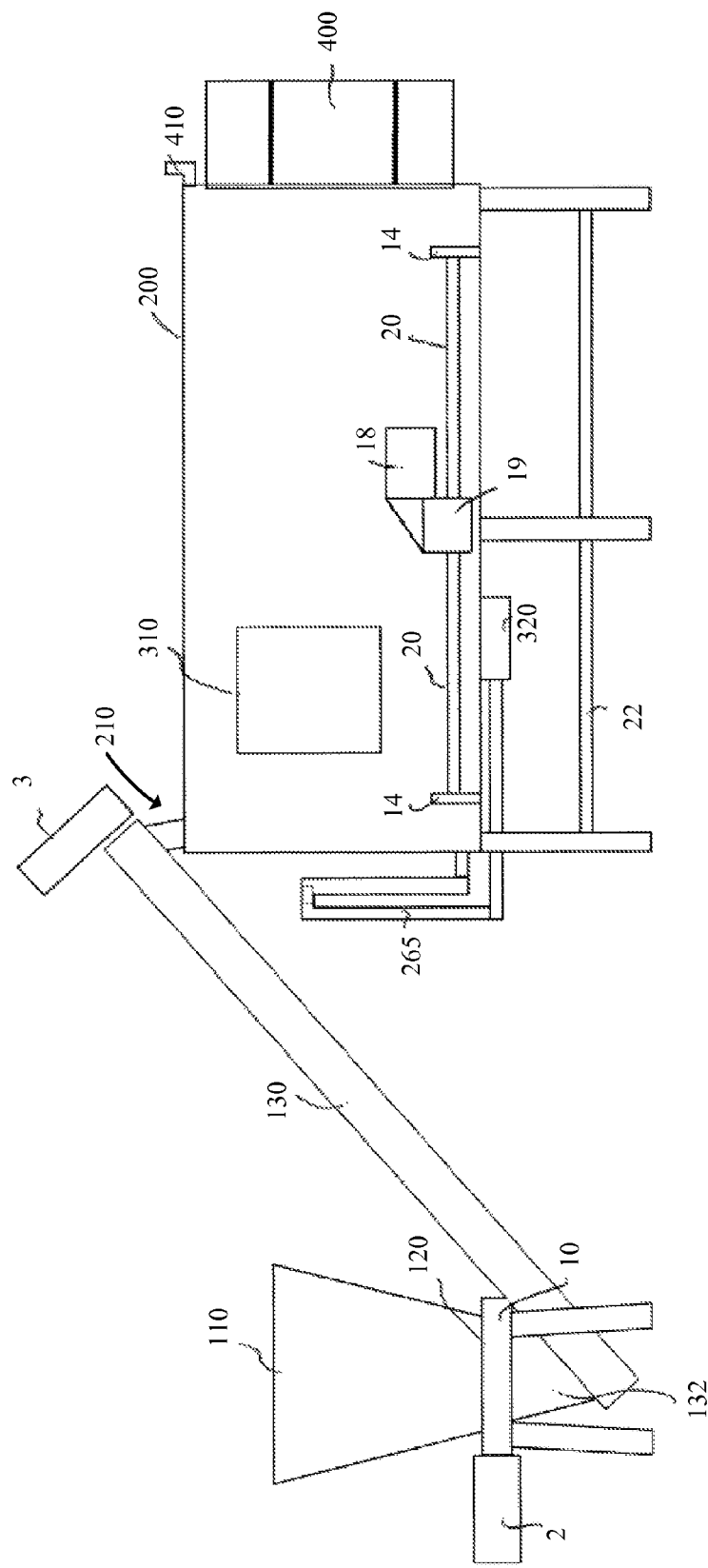
FIG. 1 is a side elevation illustrating the shredder, the loading hopper, the conveying auger, a digester vessel, and a finishing screener in accordance with one or more aspects of the present invention.

The invention is susceptible to many variations, including scaling for capacity, so long as process parameters and control logic are maintained. Accordingly, the drawings and following description of the preferred embodiment are to be regarded as illustrative in nature, and not as restrictive.

The invention provides for an aerobic in-vessel rotary drum composting system particularly suited to the accelerated digestion of food scraps. This invention provides several advantages over prior art. The composting system is capable of operating efficiently and with minimal preventative maintenance so that it may become more mainstream regarding solid waste management. The invention is designed to minimize potential malfunctions by reducing the number of moving parts. The aerobic in-vessel rotary drum composting system also enables expedient repair or other remediation of the system should such action be necessary. Another advantage of the invention includes its compliance with all applicable OSHA regulations.

High quality compost made from food scraps does not happen by accident. It is produced by carefully blending the food scraps with a bulking agent/carbon source (often wood shavings), collectively known as the feedstock, to provide various microorganisms with an optimal diet. External factors, such a temperature, oxygen availability, and moisture content of the materials to be composted greatly influence the time it takes for the microorganisms to digest the feedstock. Under optimized conditions, the microorganisms can convert food scraps based feedstock to compost in as few as 5 days.

Varying species of bacteria present in the digester vessel will break down any organic materials into the output compost mixture, and as temperatures rise and fall in the compost, different bacterial species will become more or less active. Mesophilic and thermophilic bacteria each operate best within specific temperature ranges. Furthermore, with sufficient oxygen, microorganisms produce energy, grow quickly, consume more material and make nutrients available for plant growth. Without oxygen, aerobic bacteria die off and anaerobic bacteria take over. They will break down the material, but more slowly, and with an accompanying unpleasant odor. Offensive odors are produced only when the material in the system is allowed to become anaerobic, not a normal condition in the practice of this invention.

To provide a simple, reliable, efficient, aerobic in-vessel rotary drum composting system, it is most useful to optimize the apparatus to a selected, well-defined waste stream, thus reducing the processing variables and simplifying the apparatus and operation. This technique offers the user a composting process and apparatus that produces a more consistent, higher quality, nutrient rich, end product.

The invention, in its simplest form, is an integrated or unitized reduction and composting process and system for the recycling of food scraps and associated organic waste materials such as wood shavings, into an end product that is manageable, useful, and inoffensive. This waste stream provides an abundance of nitrogen and moisture, both important in the process. The amount of carbon-rich and moisture-absorbing bulking agent can be varied, based on process conditions, by adding supplemental organic materials such as wood shavings. The invention will accept other bulking agents such as cardboard if desired, but it is specifically designed to incorporate wood shavings for the composting process of the invention.

The specified input materials for which the invention is intended must be combined in a recipe that produces a feedstock with an appropriate carbon to nitrogen ratio and moisture content. This is accomplished by blending an appropriate amount of the bulking agent/carbon source with the food scraps. The process is exothermic and requires only oxygen to be sustained to completion. The digestion vessel is well insulated, so the primary requirement of at least one embodiment of the system is to remove excess water vapor, control the temperature, and add sufficient air to supply the oxygen needed in order to sustain the process.

The system is tolerant of a limited amount of incompatible solid contaminants that may be present in particular applications or installations. The invention utilizes a continuous three-step process which has approximately a 5-day throughput cycle, consisting of shredding to the optimal particle size, then mixing and composting through an aerobic in-vessel rotary drum process. The apparatus is self-contained to provide for continuous input of feedstock, generating an output of nutrient-rich, organic compost material of significantly less volume than the feedstock.

Process constraints include particle size, relatively significant retention quantities and dwell time in the digester vessel, sufficient aeration, and temperature control. Apparatus variables to be considered are the incremental amount and frequency of drum rotations required to control the heat, in combination with size and ratio of chamber length to drum diameter, and the port sizes.

At least one embodiment of the invention utilizes a continuous three-step process that has approximately a five-day throughput cycle, consisting of shredding the feedstock (the food scraps and wood shavings) to the optimal size, conveying it to the vessel for the aerobic digestion, then off-loading and screening the compost. The high internal temperatures inside of the vessel vaporize water in the feedstock that is exhausted via a combination of enforced aeration and an exhaust vent. The apparatus is self-contained to provide for continuous input of feedstock, generating compost of substantially less volume than the feedstock.

One embodiment of the present invention is a sheer shredder that size reduces the food scraps to approximately 1 cubic inch in volume. A 5-hp electric motor powers the cutting deck. The size reduced food scraps pass through a transition connection into a screw auger that conveys the material to the input port of the digester vessel. The conveyer is powered by a 2 hp electric motor. The screw auger is enclosed in a cylinder over its entire length.

A hopper mounted above the cutting surface includes a lid with a magnetic switch that prohibits movement of the cutting blades if the lid is raised. The hopper is also of a height that makes it virtually impossible for an average person to reach her/his arm into it to the depth of the cutting blades. An access port is available to permit maintenance of the cutting blades as would exist in the event of a jam. Again, a magnetic switch prevents actuation of the blades if the port door is open. A control panel located several feet away controls the shredder. To start the cutting blades, an operator presses a button labeled "Shredder On" (there is also a "Shredder Off" button). Two opposing axes with cutting blades operate such that one turns in a clockwise direction while the other turns in a counterclockwise direction. Upon starting, each axis reverses direction for approximately ¼turn or 90 degrees, pauses momentarily, and then turns in the prescribed direction until the hopper is empty. A 5 hp motor powers the cutting deck. Shredded materials are discharged at the bottom of the cutting deck into a conveying auger.

The shredded food scraps as well as the wood shavings are conveyed to the input port of the digester vessel. The conveying auger consists of a 10-inch diameter tube with a screw auger completely enclosed inside of it. Flight edging assures full conveyance of all deposited materials and no residue buildup inside of the tube. A 2 hp motor powers the auger. The same control panel that controls the shredder controls this motor. A second column of buttons that includes an "Auger On" and "Auger Off" option appears to the right of the column for the shredder. The control protocol is designed so that the auger will not actuate if the loading door of the vessel is closed. This is made possible by a magnetic switch on the loading door.

Processing of the food scraps at this stage is accomplished by introducing them, along with the wood shavings, into the digester vessel. In at least one embodiment of the system and process of using the system, to conduct loading of materials into the vessel, assumed to be as often as daily, the operator opens the hopper lid, loads it with food scraps, and closes the lid. The lid to the input port of the digester vessel is then opened. The operating switches are then engaged to start the shredder and the auger. When the hopper is empty, the shredder is disengaged but the auger is allowed to continue to operate until the conveying tube is empty. The process is repeated until all of the feedstock has been conveyed to the digester vessel. At that point, the operating switch for the auger is disengaged. The input port for the digestion vessel is closed and the operating switch for the drum is engaged so that it makes one rotation.

To conduct off-loading of compost in at least one embodiment of the system, assumed to be as often as daily once the digester vessel reaches its operating volume, the operator opens the discharge door on the end of the digestion vessel and engages the operating switch for the drum. The vessel will rotate, and compost will tumble from the discharge door into the screener. From there, the compost will fall through the screen into whatever collection system is desired by the owner of the system, including but not limited to a trailer, pick-up truck, wheel barrow, etc. When the desired amount of compost has been off-loaded, the operator disengages the drum switch and closes the discharge door.

Preferably, the digester vessel is a single chamber of a volume calculated based on the projected daily input of feedstock. The input port is on the top of the vessel, which is cylindrical in shape, immediately at the terminus of the conveying auger. While the vessel may be constructed to various dimensions, the most common will be 6 feet in diameter by 12 feet in length. A cylinder of this size is capable of accepted 1,000 lbs. or one cubic yard of feed stock per day. The inside of the vessel includes a perforated floor through which a 3 hp blower on a programmed schedule enforces air, typically every 15 minutes. The vessel also includes an exhaust port at the top of the opposite end of the vessel. On the end of the vessel opposing the input port, a discharge door is provided for the off-loading of the compost. Two baffles are positioned at 90 and 270 degrees of the circumference of the vessel. These baffles assist in lifting and/or dropping the composting feedstock as the vessel rotates, typically once per hour. A 5 hp motor powers the direct-drive drum drive.

In at least one embodiment of a system of the present invention, the food scraps are introduced by opening the loading door to the digester vessel; turning on the auger; opening the shredder lid and depositing a measured amount of food scraps; closing the shredder lid; and turning on the shredder to allow it to operate until the hopper is empty.

The actual process of aerobic digestion occurs in the digester vessel. The actual size of the digester vessel, which, in a preferred embodiment, is cylindrical and measured by the diameter and length of it, is variable; however, typical diameters will be 3-10 feet, while typical lengths will be 6-42 feet. The needed volume of the digester vessel determines the actual dimensions. The digester vessel of the invention does not include multiple chambers as do prior art as multiple chambers are not necessary. The vessel is preferably tilted on a 1-2 degree down angle from the point of input to the point of discharge. Along with a programmed rotation once per hour, this tilt moves the composting feedstock toward the discharge end in a 5-day processing period. Baffles along the entire length inside of the digester vessel provide a lifting action and facilitate mixing of the material being composted as the digester vessel rotates. The base of the vessel includes a flat, perforated floor that permits a programmed aeration of the composting feedstock. On 15-minute intervals, a blower introduces a calculated volume of air into the digester vessel. Because the microbes involved with the digestion are so efficient, they can deplete the oxygen inside of the vessel in 15 minutes. This condition, known as anaerobic, is problematic because odors are a characteristic of this type of digestion. Because food scraps tend to have an acidic pH, the inside of the vessel is constructed of stainless steel in at least one embodiment. The vessel is also coated with 2-3 inches of closed-cell foam insulation in one or more embodiments. The insulation is then wrapped with another layer of stainless steel, to provide a profession, scientific instrument-like appearance. A screener is attached to the digestion vessel which is located on the terminal end of the vessel. Preferably, a ½ inch by ½ inch mesh forms the sides of the screener, which may form another cylinder.

The temperature within the vessel is maintained by the continuous addition of feedstock within the range of 100° Fahrenheit to 135° Fahrenheit, preferably higher than 131 degrees Fahrenheit to ensure pathogen destruction. It is also necessary to maintain this temperature range to kill any seeds present within the feedstock in one or more embodiments of the present invention. In contrast, from practice it was found that waste stream materials other than those containing pathogens, such as fruits, vegetables, paper, etc. will degrade to compost at temperatures as low as 95 degrees Fahrenheit due to the activity of mesophilic bacteria. However, it should be noted that while there are no pathogenic materials to contend with, seeds within the feedstock will not be killed at such a low temperature. Just as important, for one or more embodiments, the temperature of the mixture material should not exceed 150 degrees Fahrenheit as the aerobic bacteria will begin to die off as temperatures rise above this level.

Unlike other commercially available aerobic in-vessel rotary drum composting systems, chains or belts do not rotate the vessel. Instead, it is rotated by wheels connected to a direct drive shaft. Consequently, there are far fewer moving parts than other systems. A 3-hp motor controls the drive shaft that turns the vessel.

Also unlike other commercially available aerobic in-vessel rotary drum composting systems, the material to be digested is not introduced into the digester vessel at a center point of an end of the vessel. Instead, in at least one embodiment, the material is introduced via a port, such as a circular port, on the top of the side of the digester vessel. This 'top-loading' permits a larger usable volume of the digester vessel. A digester vessel with a diameter of 6 feet and a length of 12 feet, for example, will have a geometric volume of 11.6 cubic yards and a usable volume of 8.7 cubic yards. The usable volume assumes that the digester vessel may be filled to 75% of its geometric volume, which is only possible with a top-loading design.

The system of the invention, in at least one embodiment, also includes a process controller that serves to operate the shredder, the conveying auger, digester vessel, and blower. Safety features comprised of magnetic sensors, placed on the lid of the shredder and the input port of the vessel, prevent the unsafe operation of all aspects of the invention. The process control system serves to detect if (1) the hopper door is raised. If it is, the cutting deck of the shredder will not operate. The process control system serves to detect if (2) the cutting deck is operating. If the input port of the vessel is not open, the conveying auger will not operate. The process control system may further serve to detect if (3) the input port is open, and (4) whether the drum cycle of the vessel may be on or off. If the input port of the vessel is open, the aerator will not operate. All of these features are designed to maximize the safety of the invention and to minimize the potential for operator error. For example, the conveying auger will not operate if the input port of the digestion vessel is closed. This makes it impossible for the operator to move shredded feedstock to the vessel if the door is not open, thereby avoiding loss of the feedstock.

Figure 2:
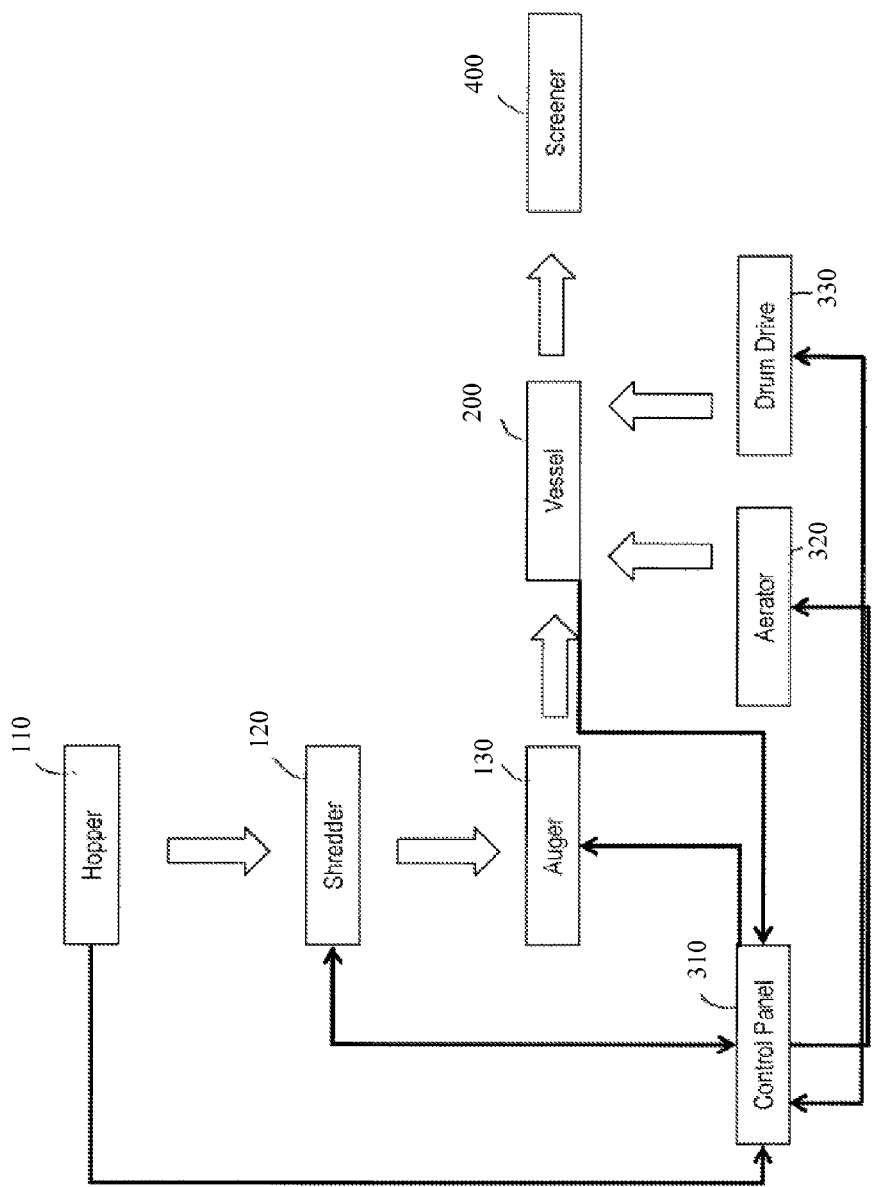
FIG. 2 is a block diagram illustrating the principal elements and the process flow of the present invention in accordance with one or more aspects of the present invention.

Referring now to FIGS. 1 and 2, there is illustrated a hopper 110, a shredder 120, an auger 130, a vessel 200, a control panel 310, an aerator 320, a drum drive 330, and a compost finishing screener 400. The hopper 110 and the shredder 120 are located on a base frame 10. The finishing screener 400 is attached to the back end of the vessel 200. Natural outgassing occurs by design in the vent (see e.g., exhaust vent 220 in FIG. 3) noted at coupling 410 when the exhaust fan is not running.

Referring to FIGS. 1 and 2, the feed hopper 110 is about 36 inches high by 28 inches deep and 24 inches wide, that is closed between feedings. The hopper 110 feeds vertically downward into shredder 120. The shredder 120 is a material shredder/particle size reducer powered by an electric motor 2 that provides low speed, high torque counter-rotating cutters that intensively shear and shred. The tooth size, blade size, and spacing of the shredder 120 are calculated to tear and shred the supplied materials into particles not larger than 1 cubic inch. The shredder 120 is capable of handling all the food scraps, including bones, as well as supplemental bulk materials, such as wood chips.

The shredder 120 feeds vertically downward into the auger 130, which is diagonally oriented and is likewise powered by an electric motor 3. The nine inch by 10 foot chute deposits the shredded material into the vessel 200.

Figure 3:
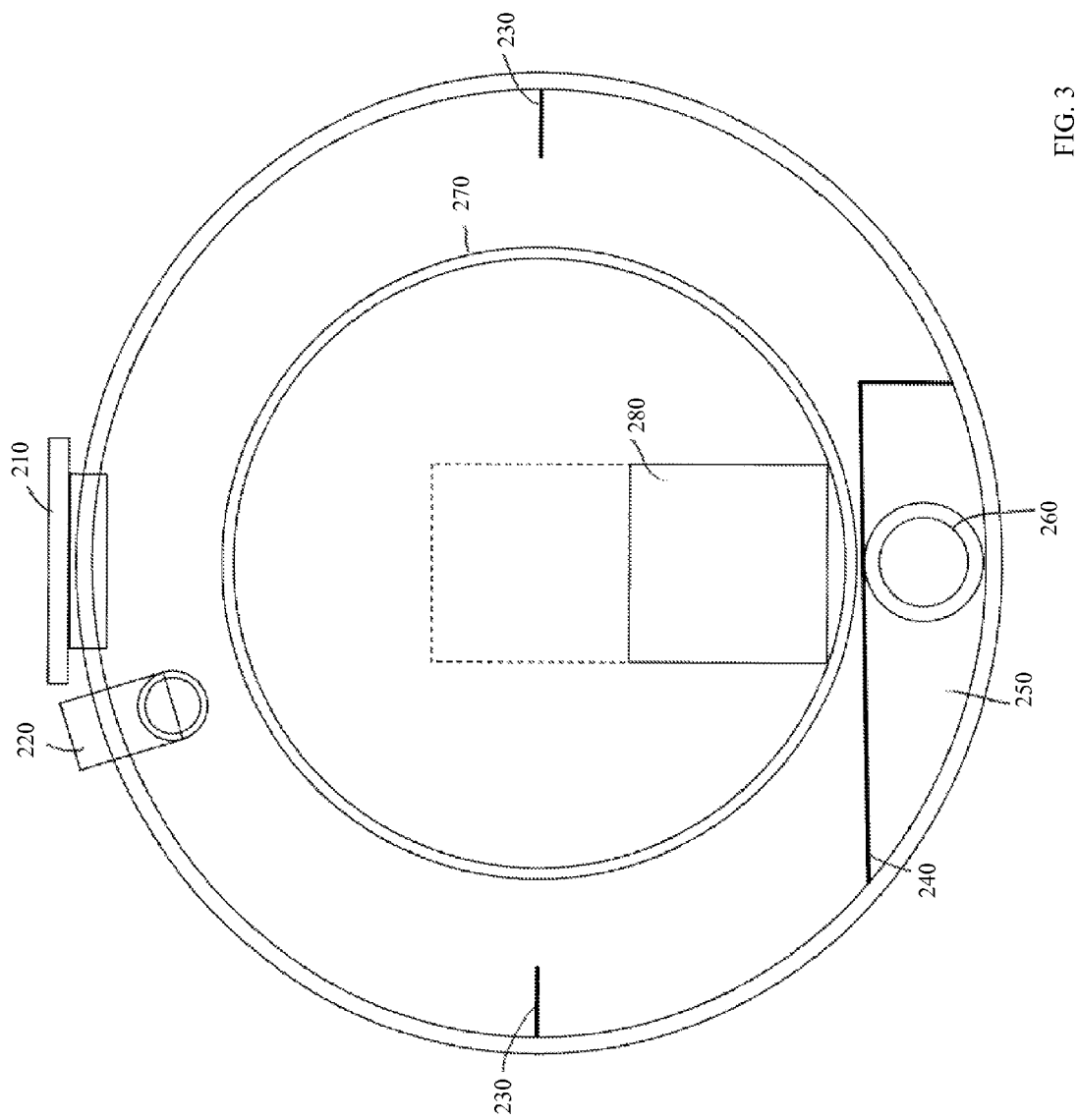
FIG. 3 is a cross section view of the side elevation of the vessel of at least one embodiment in accordance with one or more aspects of the present invention.

Referring to FIGS. 1 and 3, the digester vessel 200 consists of a 6-foot diameter, 12-foot long drum. The digester vessel 200 holds 8.7 cubic yards of working volume of materials in process, and has a throughput cycle of five days. The digester vessel 200 is preferably fabricated of stainless steel, and the vessel 200 could be made of any suitable material. The vessel 200 is mounted horizontally on the base frame 22 so as to be rotatable by a motorized direct-drive system, including at least a drive shaft 20, one or more drive wheels 14, a motor 18 and a gear box 19 (as shown in FIG. 1). As shown in FIG. 1, in addition to resting on the one or more drive wheels 14, the vessel 200 rests on two roller wheels (not shown). The front end of the vessel 200 has an input port 210 of about 12 inches diameter, through which the auger 130 deposits the shredded materials. The back end of the vessel 200 has a discharge door 280 of 16 inches×16 inches for off-loading the output material into the finishing screener 400 as shown in FIGS. 1 and 2.

Referring to FIG. 3, the exterior of the digester vessel 200 includes a finishing screener 270. The interior of the digester vessel 200 includes at least two baffles 230 that run the entire length of the interior of the vessel 200, an aeration pipe 260, an aeration plenum 250, and an aeration plenum ceiling 240. Air is forced through the aeration pipe 260 via an aerator 320 which is connected to the vessel 200 via an air pipe 265 (as shown in FIG. 1). The aeration plenum ceiling 240 includes 1,000 holes per square foot to enable the diffusion of the air provided through the aeration pipe 260. The at least two baffles 230 serve to lift the shredded material so the shredded material is allowed to tumble and undergo physical breakdown. The screener 270 is a cylindrical frame screener that serves to screen out particles larger than ½ cubic inch from the compost that is being discharged through the discharge door 280. Particles larger than ½ cubic inch are returned to the vessel 200 if they are organic and to a refuse container if they not organic. Also, an exhaust vent 220 (best seen in FIG. 3) may be used to exhaust vaporized water and/or air.

Referring to FIGS. 1 and 2, the complete process path through the apparatus is into the hopper 110, through the shredder 120, through transition 132, through the auger 130, through the input port 210, into the vessel 200, as moved by drum rotation and the gradual down slope flow through the discharge door 280 (as shown in FIG. 3), through the finishing screener 400 (as shown in FIGS. 1 and 3) and into whatever collection receptacle is desired. The process controller 310 controls at least the shredder 120, the auger 130, the drum drive 330, and the aerator 320.

As will be realized, the invention is capable of other and different embodiments, and its several details are capable of modifications in various obvious respects, all without departing from the essence of the invention. As an example, the invention can also include a bucket elevator in place of the auger, or the shredder could be connected directly to the digester vessel with no conveyance option. The invention can be scaled, so long as the critical parameters of the process are satisfied. A small version of the embodiment would be practical for a homeowner, an intermediate version is practical for use by a restaurant or supermarket, and a large version would be practical for a municipal collection/drop-off facility.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

What is claimed is:

1. An apparatus for the in-vessel composting of feedstock into nutrient-rich compost comprising:
    a shredder that operates to reduce the volume and increase the surface area of the feedstock into one or more particles having a particle size that is about one cubic inch or no larger than one cubic inch;
    a vessel operating to compost and digest the shredded feedstock having: (i) one chamber only, (ii) a first surface, a second surface and a third surface, the first and second surfaces of the vessel being spaced apart and substantially parallel to each other and the third surface of the vessel extending from the first surface to the second surface, thereby defining the one chamber only of the vessel therein, (iii) an input port disposed on, and in communication with, the third surface near, or adjacent to, the first surface of the vessel, and (iv) a discharge port disposed on, and in communication with, the second surface of the vessel, wherein the vessel is tilted such that at least a portion of the first surface is always at a higher elevation than at least a portion of the second surface;
    a conveyor operating to pass the shredded feedstock from the shredder into the input port of the vessel;
    a rotator system operating to rotate the vessel;
    an aeration system operating to at least one of (i) introduce air into the vessel and (ii) exhaust vaporized water from the vessel; and
    a process controller operating to communicate with, and control, the shredder, the vessel, the rotator system, the aeration system and the conveyor.

2. The apparatus of claim 1, wherein at least one of:
    (i) the conveyor comprises:
        an input hopper operating to facilitate feeding or introduction of the feedstock into the shredder, the input hopper being connected to the shredder, and
        an auger and a chute or conveyance tube, or a bucket elevator, connecting the shredder to the input port of the vessel;
    (ii) the input hopper includes a lid with a magnetic switch that operates to prohibit actuation of one or more cutting blades of the shredder if the lid is open, thereby adding a safety feature to the apparatus;
    (iii) the input port of the vessel includes a loading door with a magnetic switch that operates to prohibit actuation of the auger when the loading door is closed and operates to permit actuation of the auger when the loading door is opened, thereby avoiding loss of the feedstock;
    (iv) the chute or conveyance tube of the conveyor is in communication with the input port of the vessel such that the chute or conveyance tube operates to pass the feedstock from the auger to the vessel;
    (v) the auger operates until the conveyance tube is empty;
    (vi) the tilt of the vessel is on a 1-2 degree down angle from at least the portion of the first surface, or the input port on the third surface when the input port is at its substantially highest or highest elevation, to at least the portion of the second surface or the discharge port of the vessel;
    (vii) the vessel includes a layer of insulated material;
    (viii) the vessel is cylindrical; and
    (ix) the layer of insulated material of the vessel is disposed between two metal layers of the vessel, the metal layers and the layer of insulated material at least being included in the third surface of the vessel.

3. The apparatus of claim 1, wherein at least one of:
    (i) the vessel includes one or more baffles that operate to tumble the shredded feedstock located inside the vessel, thereby facilitating mixing of, and/or the physical breakdown of, the shredded feedstock as the vessel rotates;
    (ii) the one or more baffles comprises at least two baffles disposed inside the vessel, connected to the third surface and extending from the third surface radially inwards towards the center of the vessel for a predetermined distance;
    (iii) the one or more baffles comprises only two or three baffles disposed inside the vessel, connected to the third surface and extending from the third surface radially towards the center of the vessel for a predetermined distance;
    (iv) the one or more baffles extend along the entire length of the vessel;
    (v) at least a surface of the aeration system operates as an additional baffle such that the at least one surface of the aeration system facilitates the mixing of, and/or the physical breakdown of, the shredded feedstock as the vessel rotates;
    (vi) at least two surfaces of the aeration system operate as one or more additional baffles such that the at least two surfaces of the aeration system facilitate the mixing of, and/or the physical breakdown of, the shredded feedstock as the vessel rotates; and
    (vii) a first baffle of the at least two baffles is positioned at 90 degrees of the circumference of the vessel and a second baffle of the at least two baffles is positioned at 270 degrees of the circumference of the vessel.

4. The apparatus of claim 1, wherein the aeration system comprises at least one of:
    an air pipe that operates to pass air from outside of the vessel and introduce the air into an aeration port of the vessel;
    an aeration pipe connected to the aeration port of the vessel and extending through the vessel, the aeration pipe operating to release air along at least a portion of the length of the vessel or along the entire length of the vessel;
    an aeration plenum surface defining an aeration plenum located between the third surface of the vessel and the aeration plenum surface and having one or more perforations therein such that the air passing from outside the vessel through the air pipe into the aeration port and through the aeration pipe is released into the aeration plenum and then diffused into the remaining portion of the vessel via the one or more perforations of the aeration plenum surface;
    an aerator that operates to force air through the aeration pipe, through the one or more perforations of the aeration plenum surface and through the vessel;
    an aeration plenum surface defining an aeration plenum located between the third surface of the vessel and the aeration plenum surface and having a plurality of perforations therein such that the air passing from outside the vessel through the air pipe into the aeration port and through the aeration pipe is released into the aeration plenum and then diffused into the remaining portion of the vessel via the plurality of perforations of the aeration plenum surface;

an aerator that operates to force air through the aeration pipe, through the plurality of perforations of the aeration plenum surface and through the vessel; and an exhaust vent operating to exhaust at least one of the air that passes through the vessel and vaporized water, the exhaust vent being disposed on at least one of the second surface of the vessel and the third surface of the vessel.

5. The apparatus of claim 4, wherein pressure from the aeration pipe operates to force the air into and through at least one of the one or more perforations and the plurality of perforations of the aeration plenum surface.

6. The apparatus of claim 1, wherein at least one of:
(i) the apparatus and/or the vessel further operates to maintain the temperature of the vessel in the range of at least one of: 100° F. to 135° F.; 100° F. to 150° F.; 131° F. to 135° F.; 95° F. to 150° F.; 95° F. to 135° F.; and 131° F. to 150° F.; and
(ii) the feedstock is placed into the vessel when the feedstock has a temperature within the range of at least one of: 100° F. to 135° F.; 100° F. to 150° F.; 131° F. to 135° F.; 95° F. to 150° F.; 95° F. to 135° F.; and 131° F. to 150° F.

7. The apparatus of claim 1, wherein the rotator system comprises: (i) a base frame extending from and coupled to the vessel; and (ii) at least one of:
(a) a motorized direct-drive system having a motor, a drive shaft, at least one drive wheel, at least one guide wheel and a gearbox attached to the base;
(b) a motorized direct-drive system having a motor, a drive shaft, at least one drive wheel, at least one guide wheel and a gearbox attached to the base, wherein the drift shaft extends substantially along a predetermined length of the vessel and is connected to, and operates to turn, at least one or more drive wheels; and
(c) a motorized direct-drive system having a motor, a drive shaft, at least one drive wheel, at least one guide wheel and a gearbox attached to the base, wherein the drift shaft extends substantially along a predetermined length of the vessel and is connected to, and operates to turn, at least two drive wheels.

8. The apparatus of claim 1, further comprising at least one of:
(i) a discharge door attached to the discharge port of the vessel, the discharge door operating to be closed when the vessel is composting and/or rotating and operates to be opened when the digested or composted feedstock is being removed from the vessel;
(ii) a screener that operates to screen the digested feedstock as the digested feedstock is discharged from the discharge port of the vessel; and
(iii) only one screener that operates to screen the digested feedstock as the digested feedstock is discharged from the discharge port of the vessel.

9. The apparatus of claim 8, wherein the screener includes a mesh that operates to at least one of: (i) screen the digested feedstock leaving the vessel and entering a discharge collection vessel or container; and (ii) remove one or more particles of the digested feedstock that are larger than ½ cubic inch.

10. An apparatus for the in-vessel composting of feedstock into nutrient-rich compost comprising:
a shredder that operates to reduce the volume and increase the surface area of the feedstock;
a cylindrical vessel in communication with the shredder, the vessel operating to compost and digest the shredded feedstock received from the shredder and the vessel having: (i) one chamber only, (ii) a first surface, a second surface and a third surface, the first and second surfaces of the vessel being spaced apart and substantially parallel to each other and the third surface of the vessel extending from the first surface to the second surface, thereby defining the one chamber only of the vessel therein and the cylindrical shape of the vessel, (iii) an input port disposed on, and in communication with, the third surface near, or adjacent to, the first surface of the vessel, and (iv) a discharge port disposed on, and in communication with, the second surface of the vessel, wherein the vessel is tilted such that at least a portion of the first surface is always at a higher elevation than at least a portion of the second surface; and
a rotator system operating to rotate the vessel.

11. The apparatus of claim 10, further comprising:
a conveyor operating to pass the shredded feedstock from the shredder into the input port of the vessel;
an aeration system operating to at least one of (i) introduce air into the vessel and (ii) exhaust vaporized water from the vessel; and
a process controller operating to communicate with, and control, the shredder, the vessel, the rotator system, the aeration system and the conveyor.

12. The apparatus of claim 11, wherein at least one of:
(i) the shredder is directly connected to the vessel or the apparatus further includes a conveyor operating to pass the shredded feedstock from the shredder into the input port of the vessel;
(ii) the conveyor comprises an auger and a chute or conveyance tube, or a bucket elevator, connecting the shredder to the input port of the vessel, and an input hopper operating to facilitate feeding or introduction of the feedstock into the shredder, the input hopper being connected to the shredder;
(iii) the input hopper includes a lid with a magnetic switch that operates to prohibit actuation of one or more cutting blades of the shredder if the lid is open, thereby adding a safety feature to the apparatus;
(iv) the input port of the vessel includes a loading door with a magnetic switch that operates to prohibit actuation of the auger when the loading door is closed and operates to permit actuation of the auger when the loading door is opened, thereby avoiding loss of the feedstock;
(v) the chute or conveyance tube of the conveyor is in communication with the input port of the vessel such that the chute or conveyance tube operates to pass the feedstock from the auger to the vessel;
(vi) the auger operates until the conveyance tube is empty;
(vii) the tilt of the vessel is on a 1-2 degree down angle from at least the portion of the first surface, or the input port on the third surface when the input port is at its substantially highest or highest elevation, to at least the portion of the second surface or the discharge port of the vessel;
(viii) the vessel includes a layer of insulated material; and
(ix) the layer of insulated material of the vessel is disposed between two metal layers of the vessel, the metal layers and the layer of insulated material at least being included in the third surface of the vessel.

13. The apparatus of claim 11, wherein at least one of:
(i) the vessel includes one or more baffles that operate to tumble the shredded feedstock located inside the vessel, thereby facilitating mixing of, and/or the physical breakdown of, the shredded feedstock as the vessel rotates;
(ii) the one or more baffles comprises at least two baffles disposed inside the vessel, connected to the third surface and extending from the third surface radially inwards towards the center of the vessel for a predetermined distance;

(iii) a first baffle of the at least two baffles is positioned at 90 degrees of the circumference of the vessel and a second baffle of the at least two baffles is positioned at 270 degrees of the circumference of the vessel;

(iv) the one or more baffles comprises only two or three baffles disposed inside the vessel, connected to the third surface and extending from the third surface radially towards the center of the vessel for a predetermined distance;

(v) the one or more baffles extend along the entire length of the vessel;

(vi) at least a surface of the aeration system operates as an additional baffle such that the at least one surface of the aeration system facilitates the mixing of, and/or the physical breakdown of, the shredded feedstock as the vessel rotates; and (vii) at least two surfaces of the aeration system operate as one or more additional baffles such that the at least two surfaces of the aeration system facilitate the mixing of, and/or the physical breakdown of, the shredded feedstock as the vessel rotates.

14. The apparatus of claim 11, wherein the aeration system comprises at least one of:

an air pipe that operates to pass air from outside of the vessel and introduce the air into an aeration port of the vessel;

an aeration pipe connected to the aeration port of the vessel and extending through the vessel, the aeration pipe operating to release air along at least a portion of the length of the vessel or along the entire length of the vessel;

an aeration plenum surface defining an aeration plenum located between the third surface of the vessel and the aeration plenum surface and having one or more perforations therein such that the air passing from outside the vessel through the air pipe into the aeration port and through the aeration pipe is released into the aeration plenum and then diffused into the remaining portion of the vessel via the one or more perforations of the aeration plenum surface;

an aerator that operates to force air through the aeration pipe, through the one or more perforations of the aeration plenum surface and through the vessel;

an aeration plenum surface defining an aeration plenum located between the third surface of the vessel and the aeration plenum surface and having a plurality of perforations therein such that the air passing from outside the vessel through the air pipe into the aeration port and through the aeration pipe is released into the aeration plenum and then diffused into the remaining portion of the vessel via the plurality of perforations of the aeration plenum surface;

an aerator that operates to force air through the aeration pipe, through the plurality of perforations of the aeration plenum surface and through the vessel; and an exhaust vent operating to exhaust at least one of the air that passes through the vessel and vaporized water, the exhaust vent being disposed on at least one of the second surface of the vessel and the third surface of the vessel.

15. The apparatus of claim 14, wherein pressure from the aeration pipe operates to force the air into and through at least one of the one or more perforations and the plurality of perforations of the aeration plenum surface.

16. The apparatus of claim 10, wherein at least one of:

(i) the apparatus and/or the vessel further operates to maintain the temperature of the vessel in the range of at least one of: 100° F. to 135° F.; 100° F. to 150° F.; 131° F. to 135° F.; 95° F. to 150° F.; 95° F. to 135° F.; and 131° F. to 150° F.; and (ii) the feedstock is placed into the vessel when the feedstock has a temperature within the range of at least one of: 100° F. to 135° F.; 100° F. to 150° F.; 131° F. to 135° F.; 95° F. to 150° F.; 95° F. to 135° F.; and 131° F. to 150° F.

17. The apparatus of claim 10, wherein the rotator system comprises: (i) a base frame extending from and coupled to the vessel; and (ii) at least one of:

(a) a motorized direct-drive system having a motor, a drive shaft, at least one drive wheel, at least one guide wheel and a gearbox attached to the base;

(b) a motorized direct-drive system having a motor, a drive shaft, at least one drive wheel, at least one guide wheel and a gearbox attached to the base, wherein the drift shaft extends substantially along a predetermined length of the vessel and is connected to, and operates to turn, at least one or more drive wheels; and (c) a motorized direct-drive system having a motor, a drive shaft, at least one drive wheel, at least one guide wheel and a gearbox attached to the base, wherein the drift shaft extends substantially along a predetermined length of the vessel and is connected to, and operates to turn, at least two drive wheels.

18. The apparatus of claim 10, further comprising at least one of:

(i) a discharge door attached to the discharge port of the vessel, the discharge door operating to be closed when the vessel is composting and/or rotating and operates to be opened when the digested or composted feedstock is being removed from the vessel;

(ii) a screener that operates to screen the digested feedstock as the digested feedstock is discharged from the discharge port of the vessel; and (iii) only one screener that operates to screen the digested feedstock as the digested feedstock is discharged from the discharge port of the vessel.

19. The apparatus of claim 18, wherein the screener includes a mesh that operates to at least one of: (i) screen the digested feedstock leaving the vessel and entering a discharge collection vessel or container; and (ii) remove one or more particles of the digested feedstock that are larger than ½ cubic inch.

* * * * *